United States Patent [19]

Shimomura

[11] Patent Number: 4,756,185

[45] Date of Patent: Jul. 12, 1988

[54] FUEL CONTROL APPARATUS

[75] Inventor: Setsuhiro Shimomura, Himeji, Japan

[73] Assignee: Mitsubishi Denki Kabushiki Kaisha, Tokyo, Japan

[21] Appl. No.: 31,462

[22] Filed: Mar. 30, 1987

[30] Foreign Application Priority Data

| Mar. 31, 1986 | [JP] | Japan | 61-76141 |
| Apr. 1, 1986 | [JP] | Japan | 61-75846 |
| Apr. 22, 1986 | [JP] | Japan | 61-95130 |
| Apr. 22, 1986 | [JP] | Japan | 61-95131 |

[51] Int. Cl.$^4$ .............................................. G01F 1/68
[52] U.S. Cl. ................................................ 73/118.2
[58] Field of Search ................ 123/494; 73/118.2, 204

[56] References Cited

U.S. PATENT DOCUMENTS

| 4,357,829 | 11/1982 | Kraus et al. | 73/118.2 |
| 4,462,251 | 7/1984 | Sumal | 73/118.2 |
| 4,505,248 | 3/1985 | Yuzawa et al. | 123/494 |
| 4,565,091 | 1/1986 | Ito et al. | 73/204 |
| 4,579,098 | 4/1986 | Mattes et al. | 123/494 |

FOREIGN PATENT DOCUMENTS

| 2927378 | 1/1981 | Fed. Rep. of Germany . |
| 3207394 | 9/1983 | Fed. Rep. of Germany . |
| 54-76182 | 6/1979 | Japan . |
| 59-201935 | 11/1984 | Japan | 123/494 |
| 60-53638 | 3/1985 | Japan | 123/494 |
| 2120390 | 11/1983 | United Kingdom . |

OTHER PUBLICATIONS

Patent Abstracts of Japan, vol. 8, No. 121 (P-278)[1558], 7th Jun. 1984; & JP-A-59 27 222 (Nissan Jidosha K.K.) 13-02-1984.

Primary Examiner—Andrew M. Dolinar
Attorney, Agent, or Firm—Oblon, Fisher, Spivak, McClelland & Maier

[57] ABSTRACT

A fuel control apparatus comprises a burn-off control section for heating a hot wire at a temperature higher than a temperature in the ordinal operation of an internal combustion engine after the engine is stopped, so as to burn off a deposit on the hot wire, and a burn-off prohibiting section for prohibiting its operation after the engine stop by detecting that an output value from a hot-wire type intake air quantity sensor has reached a predetermined level.

5 Claims, 13 Drawing Sheets

FUEL CONTROL APPARATUS

The present invention relates to a fuel control apparatus for an internal combustion engine. More particularly, it relates to an improved system for burning at a high temperature a deposit on the surface of a hot-wire type intake air quantity sensor used for the fuel control apparatus.

The characteristics of hot-wire type intake air quantity sensors change depending on substances deposited on the surface of the sensors. Deposition of the substances causes an error in the quantity of fuel to be supplied to an engine, whereby there arise problems of deterioration of the exhaust gas and reduction in operational performance. To cope with the problems, the hot wire has been heretofore heated at a temperature higher than a temperature in the normal operation of the engine after the engine has been stopped to thereby burn off the deposit. A method of burning-off of the deposit is disclosed, for instance, in Japanese Unexamined Patent Publication No. 76182/1979.

It is revealed from experiments that temperature for heating the hot wire should be about 1000° C. in order to obtain an effective burning-off operation. However, when the hot wire is heated at 1000° C., a fuel-air mixture is possibly fired. The firing of the fuel-air mixture is inconvenient for the operation of the intake air quantity sensor disposed in an intake passage for a gasoline engine. Heretofore, in order to avoid the firing of the fuel-air mixture, the burning-off operations have been carried out only when the temperature of the intake passage and the revolution of the engine satisfy predetermined conditions during its operation and the fuel-air mixture exessively supplied to the intake passage during warming-up operations for the engine is sufficiently scavenged. Alternatively, the burning-off operations have been carried out before the fuel-air mixture reversely flowing from a fuel supplying portion after the engine has been stopped reaches the intake air quantity sensor, the reversing time of the mixture being obtained by experiments.

However, various experiments revealed that the burning-off under the above-mentioned conditions have not provided a sufficient result because the firing of the fuel-air mixture has been often caused. Namely, a phenomenon of back fire takes place due to irregularity of burning which is caused by error in air-fuel ratio resulted from acceleration or deceleration of the engine even though the warming-up operation of the engine is finished. Further, a large amount of gasoline staying near a fuel control valve is reversely flown to the sensor when the engine is operated in the fully opened condition even though the warming up operation of the engine has been finished. In these cases, since a large amount of gasoline remains near the intake air quantity sensor disposed in the intake passage, it is fired by the burning-off operation even after the engine has been stopped and the above-mentioned conditions have been satisfied.

It is an object of the present invention to provide a fuel control apparatus for eliminating possibility of the firing of a fuel-air mixture in buring-off operations.

According to the present invention, there is provided a fuel control apparatus for calculating the quantity of fuel required for an internal combustion engine based on an output of a hot-wire type intake air quantity sensor disposed in an intake passage for the internal combustion engine and supplying the optimum amount of fuel to the engine by controlling a fuel control valve in accordance with the calculated value characterized in that the fuel control apparatus comprises a burn-off section for heating the hot wire at a temperature higher than an ordinal operation temperature, after the engine has been stopped, so as to burn off a deposit on the hot wire, and a burn-off prohibiting section for prohibiting its operation after the engine stop by detecting that an output value from the sensor has reached a predetermined level.

As another aspect of the present invention, there is provided a fuel control apparatus comprising means for supplying fuel to an internal combustion engine depending on the operation of a fuel control valve, a hot-wire type intake air quantity sensor disposed in an intake passage for the engine to detect the quantity of air passing therethrough, a memory adapted to be set when the condition of said engine satisfies given terms of operation and to be reset when an output value from said sensor reaches a predetermined level, and an electronic control unit for controlling the heating of a hot wire at a temperature higher than an ordinal operation temperature under the condition that said memory is set after said engine has been stopped, whereby a deposit on said hot wire is burned off.

In the drawings:

FIGS. 4(a) and (b) show waveforms of a pressure in an intake passage and an output from an intake air quantity sensor when a back fire occurs;

FIGS. 11(a1) and (b) show waveforms of a pressure in an intake passage and an output from an intake air quantity sensor when a back fire occurs in the fuel control apparatus of the present invention;

Preferred embodiments of the fuel control apparatus of the present invention will be described with reference to drawings.

Figure 1:
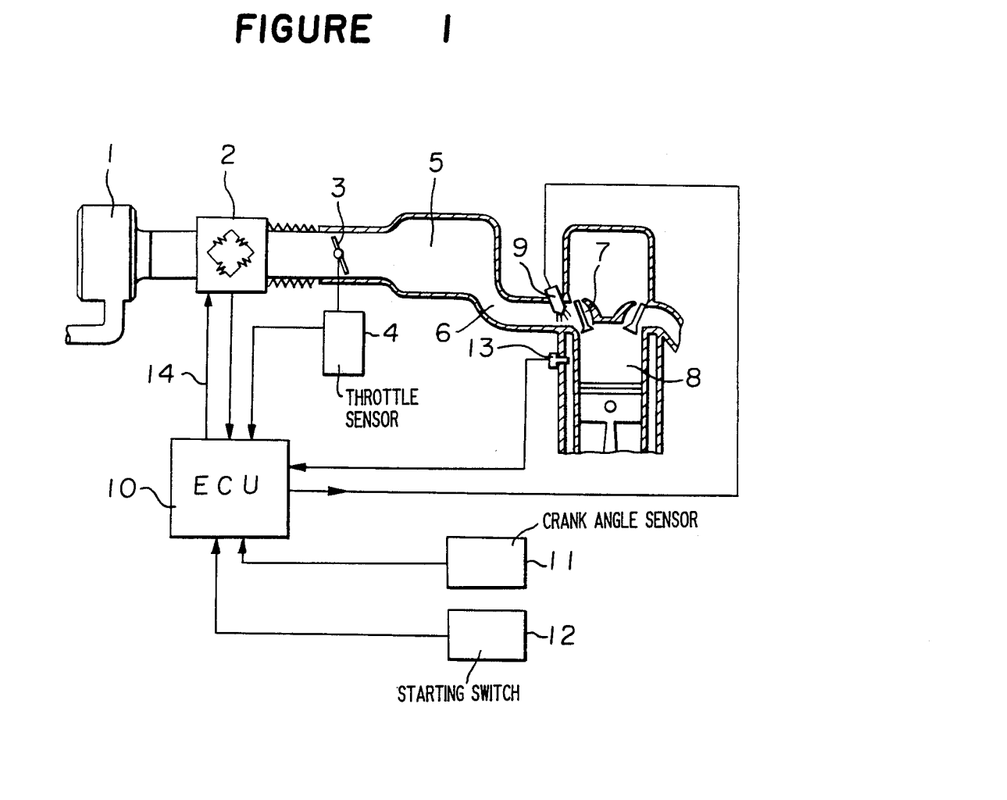
FIG. 1 is a diagram showing an embodiment of the fuel control apparatus according to the present invention.

FIG. 1 is a diagram showing the construction of a typical fuel injection controlling apparatus using a hot-wire intake air quantity sensor (hereinbelow, referred to as an AFS) for detecting the air quantity sucked into an internal combustion engine. In FIG. 1, a reference numeral 1 designates an air cleaner and the AFS2 is disposed in an air intake passage connected to the air cleaner. A numeral 3 designates a throttle valve for controlling the quantity of air sucked into the engine, a numeral 4 designates a throttle sensor being operable in association with the throttle valve 3 and generating a voltage signal depending on the movement of the throttle valve 3, a numeral 5 designates a surge tank, a numeral 6 desigantes an intake manifold, and a numeral 7 designates an inlet valve driven by a cam (not shown).

A fuel control valve 9 (hereinbelow referred to as an injector) is provided for each cylinder 8. In FIG. 1, only one cylinder 8 is shown for simplification of the figure and a plurality of the cylinders are in fact provided in the engine. A numeral 10 designates an electronic control unit (hereinbelow, referred to as an ECU) which controls an amount of the fuel injected from the injector 9 at a predetermined air-fuel ratio with respect to the quantity of air sucked to each of the cylinders 8. The ECU 10 determines the fuel quantity to be injected on the basis of each signal from the AFS2, a crank angle sensor 11, a starting switch 12, a temperature sensor 13 for detecting the temperature of cooling water for the engine and a throttle sensor 4, and controls the pulse width for feeding the fuel so that the fuel is intermittently injected from the injector 9 in synchronism with the signal of the crank angle sensor 11 at a constant interval. The ECU 10 generates a burning-off control signal 14 when conditions for the burning-off are all satisfied. The construction and function related to control of the burning-off of the AFS are well known, therefore description is omitted.

Figure 2:
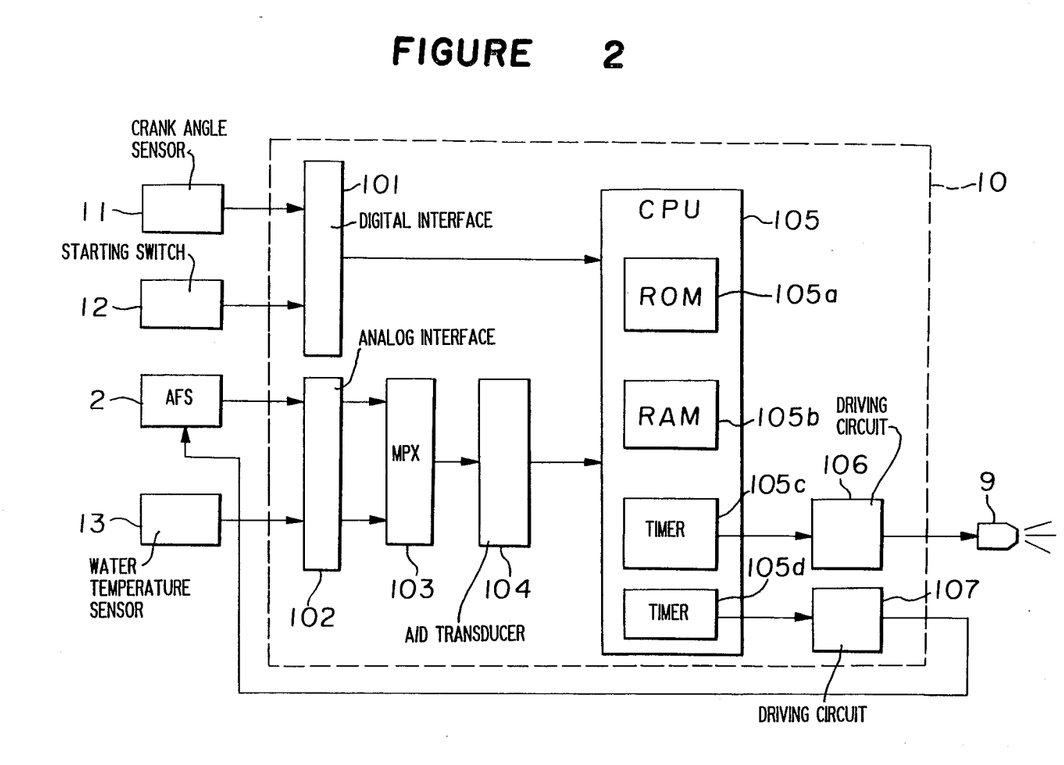
FIG. 2 is a block diagram showing an embodiment of the electronic control unit used for the fuel control apparatus shown in FIG. 1.

FIG. 2 is a block diagram showing an internal structure of the ECU 10. In FIG. 2, a reference numeral 101 designates an interface circuit for inputting digital values from the crank angle sensor 11 and the starting switch 12, a numeral 102 designates an interface circuit for inputting analogue values from the AFS2 and the temperature sensor 13, a numeral 103 designates a multiplexer and a numeral 104 designates an A/D transducer for converting the analogue values into degital values. A numeral 105 designates a central processing unit (CPU) comprising an ROM 105a, an RAM 105b and timers 105c and 105d. The CPU calculates the pulse width for actuating the injector according to a program stored in the ROM 105a on the basis of the signals from the interface circuit 101 and the A/D transducer 104, and outputs a pulse having a predetermined time width through the timer 105c. A numeral 106 designates a driving circuit for amplifying the pulse signal to drive the injector 9. A system for controlling the quantity of the fuel is known, and therefore description is omitted.

Figure 3A:
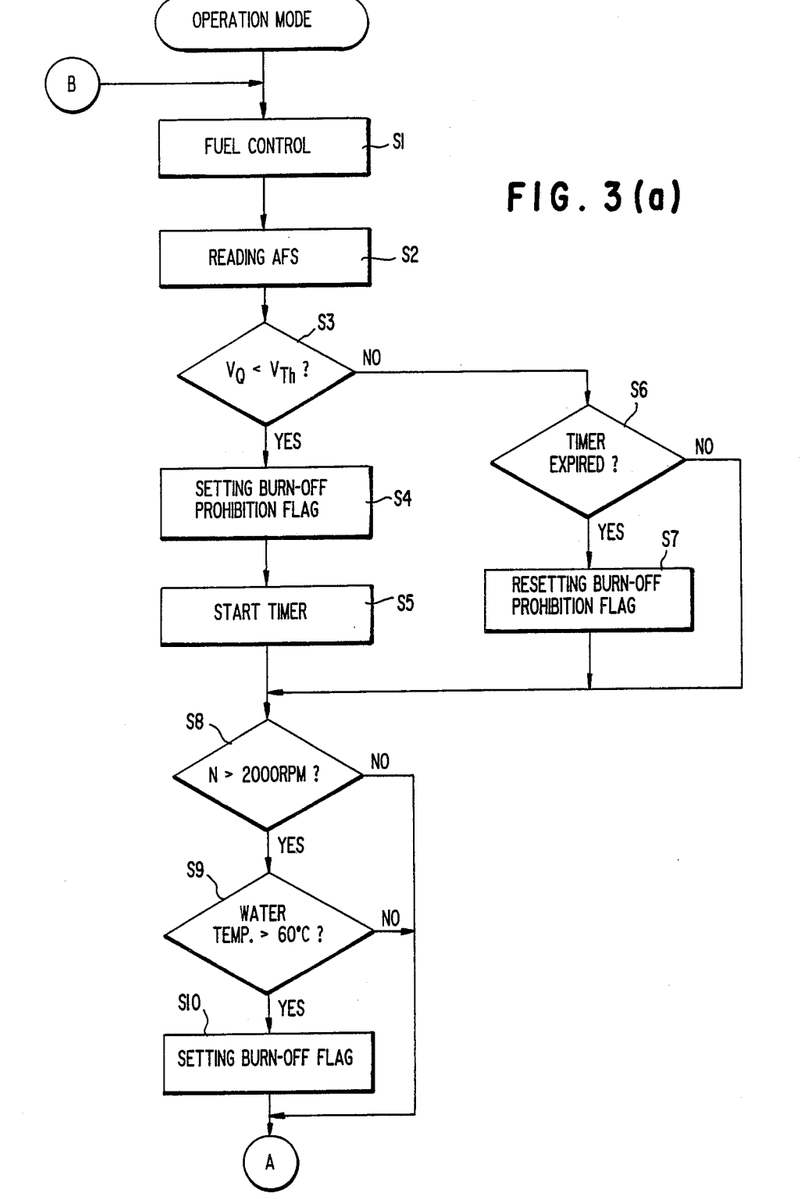
FIGS. 3(a) and 3(b) are a flow chart showing the operation of the fuel control apparatus of the present invention.
Figure 3B:
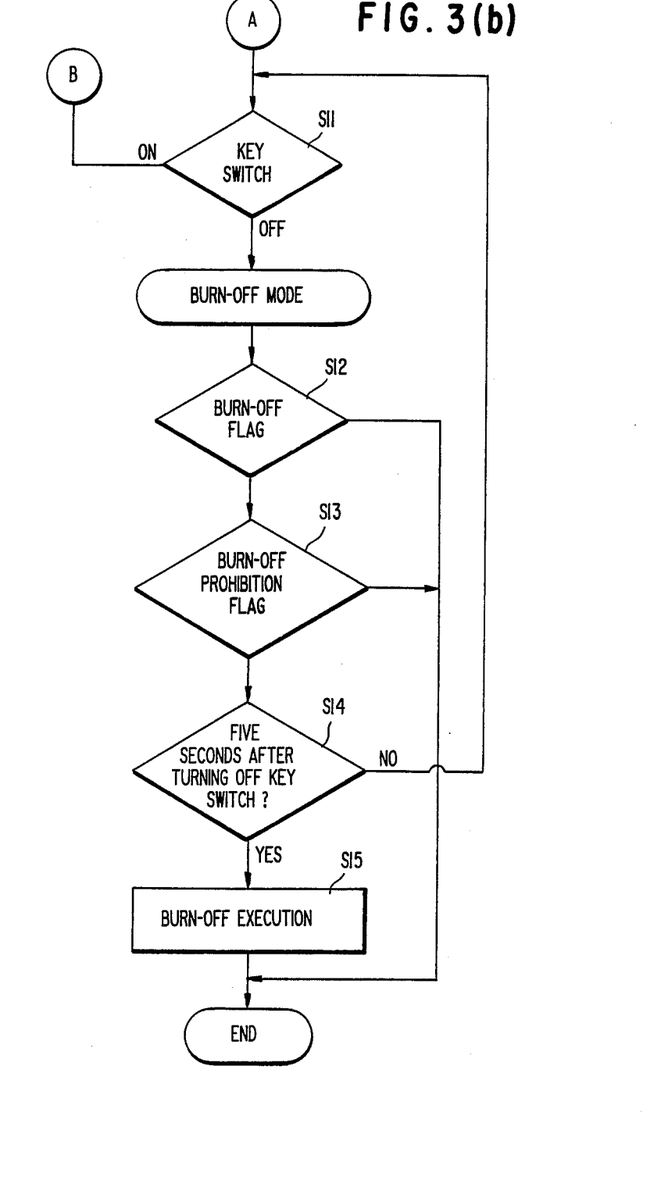

The timer 105d is adapted to produce a burning-off pulse singal according to a programmed operation as shown in FIG. 3, the pulse signal is amplified in the driving circuit 107 to be supplied as a burning off signal 14 to the AFS2.

An embodiment of a program related to the burning-off operation of the AFS2 will be described with reference to FIG. 3.

In operation mode, a series of fuel controlling operations are carried out at Step S1. Description concerning the fuel control operations is omitted because it is well known.

At Step S2, an output voltage $V_Q$ from the AFS2 is read, and the output voltage $V_Q$ is compared with a predetermined value $V_{Th}$ at Step S3. The value $V_{Th}$ will be described using FIG. 4 which shows waveforms of a pressure P in an intake passage and an output $V_Q$ of the AFS2 when a back fire occurs. The back fire raises the pressure P in the intake passage with the result of intense reverse flow of air in the intake passage. Since the AFS2 cannot detect the direction of an air stream, the output voltage $V_Q$ of the AFS2 increases in response to the intense reverse flow. Then, back fire gas having a high temperature reaches the AFS2 and the temperature of the hot wire abnormally rises. Then, an electric current to the AFS2 is stopped by a temperature control circuit, whereby the output $V_Q$ of the AFS2 is reduced to nearly zero volt. When the air stream in the intake passage returned to the normal condition, the operation of the temperature control circuit for heating the hot wire becomes normal. In this case, the value $V_{Th}$ is set to be slightly higher than a level to which the output of the AFS2 is reduced when the back fire takes place.

Returning to FIG. 3, when the condition of $V_Q < V_{Th}$ is given, namely, when the back fire occurs, a burning-off prohibition flag is set at Step S4. A timer is started at step S5 and the burn-off prohibition flag is not reset until this timer has expired. In this embodiment, working time of the timer corresponds to the time that gasoline which is not burned yet and reversely flown at and near the AFS2 is entirely evacuated by a fresh air sucked through the air cleaner. When the working time of the timer is over, operation moves form Step S6 to Step S7, at which the burning-off prohibition flag is reset. In this case, the subsequent burning-off operation is not affected.

If the working time of the timer is not yet over, the operation is moved to Step S8 while the burning-off prohibition flag is set. At Step 8, if the revolution N exceeds 2000 rpm, determination is then made as to whether or not the temperature of water is 60° C. or higher. If yes, the gasoline excessively supplied during the warming-up operation and remaining in the intake passage is sufficiently evacuated since the warming-up operation of the engine is finished and the engine is operated at high speed. Then, a burning-off flag is set at Step 10 by the determination that the burning-off operation is possible. The operations from Step 8 to Step 10 are similar to those in the conventional system.

Then, determination is made as to wheter or not a key switch is in an ON state or an OFF state. If it is in the ON state, then the sequential operation is returned to Step S1 to continue the engine operation mode. If the key switch is in the OFF state, burning-off mode is taken. At Step S12, the state of the burning-off flag is checked. If it is in a set state, then, Step S13 is taken, where the state of the burning-off prohibition flag is checked. If it is in a reset state, then, operation goes to Step S14. At Step S14, determination is made as to whether or not five seconds has passed after the key switch had been turned off. The time is determined in consideration of the time that the engine is completely stopped after the turning-off of the key switch, hence the air stream in the intake passage is completely stopped, and the time that the fuel-air mixture reversely comes to the AFS2 from the fuel supplying portion. When five seconds have gone, the burning-off operation is carried out at Step S15. For the burning-off operation, a pulse having about one second is given to the AFS2.

The explanation as above-mentioned is the case that the burning-off prohibition flag is reset. However, when the back fire takes place and the working time of the timer is not yet over, the burning-off prohibition flag at Step S7 is not reset. When the sequential operation goes to the burning-off mode under such condition, the burning-off operation is not carried out in accordance with the determination at Step S13. Accordingly, there is no risk of the firing of the gasoline.

In this embodiment, the lapse of time after the occurrance of the back fire is judged in the Steps S5–S7. However, elimination of the firing of the gasoline reversed by the back fire can be attained even by omitting these Steps S5–S7.

Figure 5:
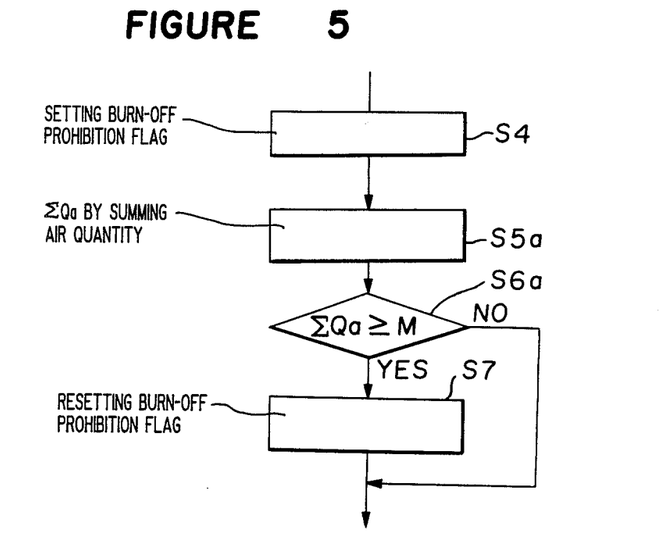
FIG. 5 is a flow chart showing a modification of the flow chart shown in FIG. 3.

FIG. 5 shows a flow chart as a modified embodiment. The modified embodiment is the same as the embodiment shown in FIG. 3 except Steps S4–S7.

In FIG. 5, when the burning-off prohibition flag is set at Step S4, summing of the air quantity sucked is initiated at Step S5a. A summed value of $\Sigma Qa$ is compared with a predetermined value M at Step S6a. When the summed value $\Sigma Qa$ is equal to or greater than the predetermined value M, the burning-off prohibition flag is reset at Step 7. The predetermined value M is given so as to correspond the total air quantity necessary to substantially evacuating the gasoline reversed by the back fire. Once $\Sigma Qa \geq M$ is established, the burning-off prohibition flag is reset because it is unnecessary to prohibit the burning-off operation.

Figure 4:
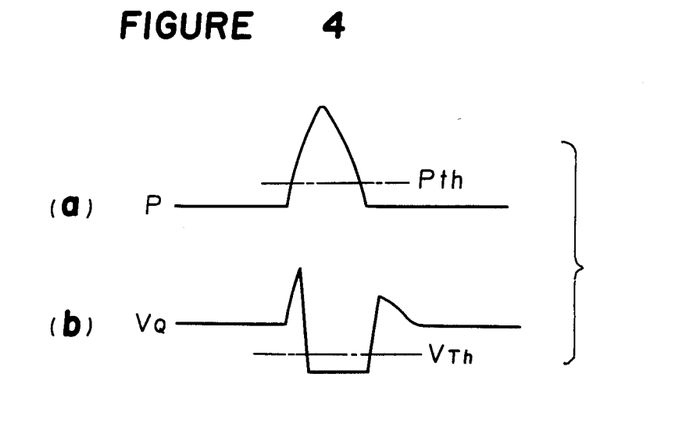

In the above-mentioned embodiment, detection of the back fire is carried out by using the waveform of the output voltage from the AFS2. However, another way may be used. Namely, there is a phenomenon that pressure P in the intake passage increases when the back fire occurs as shown in FIG. 4. Accordingly, a pressure sensor is placed in the intake passage so that the back fire is detected by comparing the output of the pressure sensor with a predetermined value Pth.

Thus, in the embodiment described above, undesired firing of the gasoline reverse by flown by the back fire is avoidable because it is contrived to prohibit the burning off when the back fire is detected. Further, detection of the back fire can be done by using the waveform of the output of the hot-wire type intake air quantity sensor, and the theory of control for prohibition of the burning off can be attained by a slight modification of the program, and accordingly, there is no substantial increase in cost.

Figure 6A:
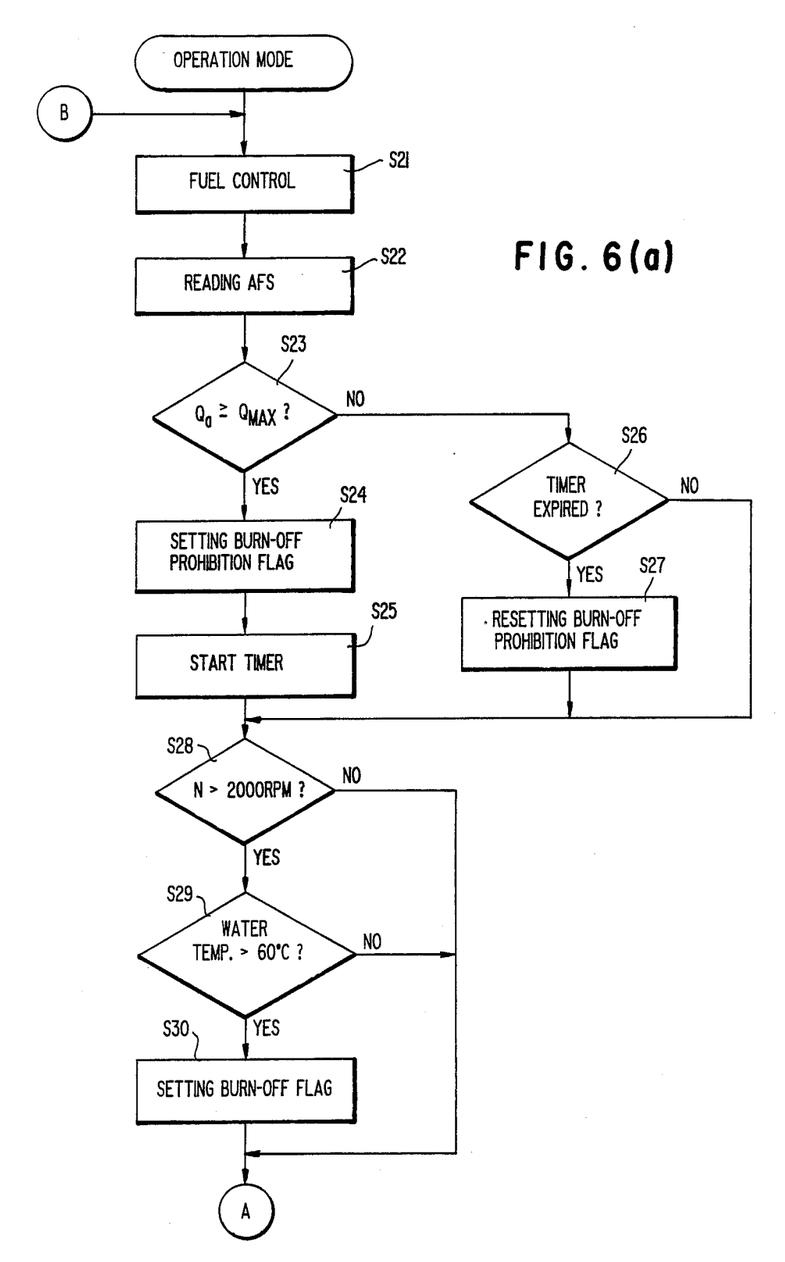
FIGS. 6(a) and 6(b) are a flow chart of the second embodiment of the fuel control apparatus according to the present invention.
Figure 6B:
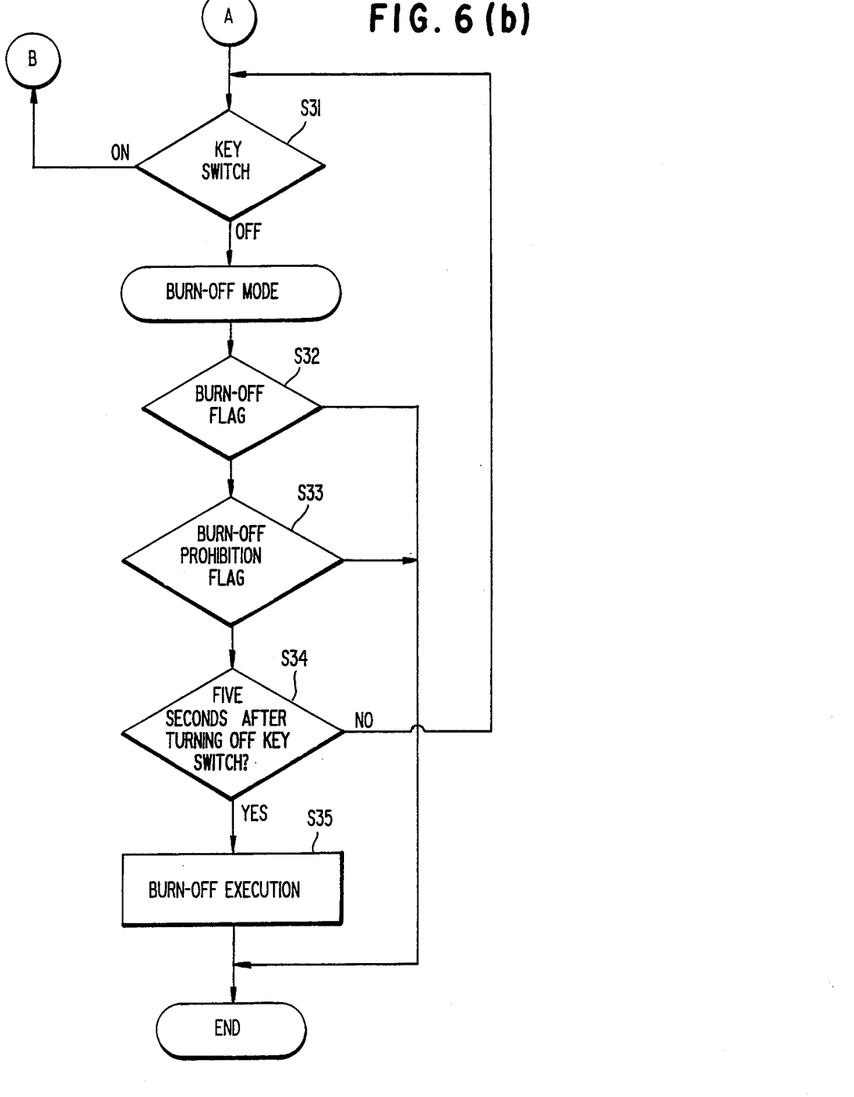
Figures 7A, 7B:
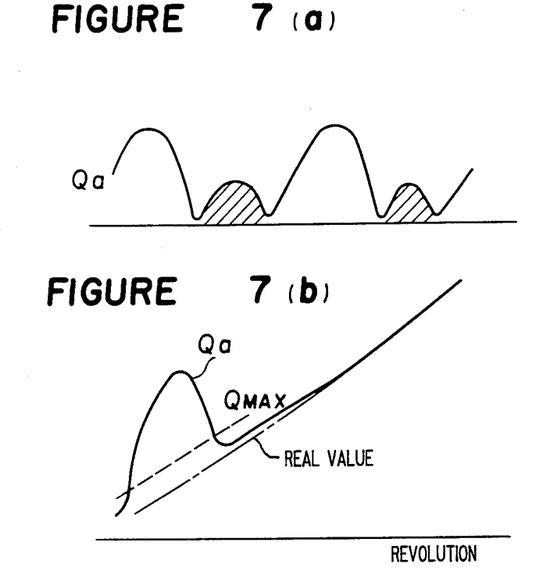
FIGS. 7(a) and 7(b) are a characteristic diagram of the output of the intake air quantity sensor of the present invention when an internal combustion engine is operated under fully open condition.

A second embodiment of the fuel control apparatus according to the present invention will be described with reference to FIGS. 6 to 8. The general construction of the second embodiment is the same as that of the first embodiment shown in FIGS. 1 and 2 except the program for controlling the burning-off operation. Accordingly, the same reference numerals designate the same parts.

In the second embodiment, the burning-off prohibition section is adapted to detect the fully opened condition of the engine by using the waveform of the output signal of the hot-wire type intake air quantity sensor to thereby set a burning-off prohibition flag, and to stop the operation of a burning-off control section when the engine is stopped under the condition that the burning-off prohibition flag is set. Further, the burning-off prohibition section is adapted to reset the burning-off prohibition flag when a time duration from the setting of the burning-off prohibition flag to the stoppage of the engine exceeds a predetermined length. Thus, the burning-off prohibition section prohibits the burning-off operation for only the minium length of time.

In the next place, a program for controlling the burning-off operation will be described with reference to FIG. 6.

A series of fuel control operations is carried out in operational mode in a usual manner at Step S21. An output value Qa from the AFS2 is read and the value is compared with a predetermined value $Q_{MAX}$ at Step S23. With respect to the predetermined value $Q_{MAX}$, explanation will be explained with reference to FIGS. 7a and 7b. FIG. 7a shows a waveform of a signal indicative of the intake air quantity Qa detected by the AFS2 when the engine is operated under fully opened condition, and FIG. 7b shows a relation of the intake air quantity Q to the revolution of the engine.

When the engine is operated under the fully opened condition, the fuel-air mixture is reversely flown from the engine. Since the AFS2 cannot detect the direction of the air stream, hence it detects the reverse flow as if the air flow is a positive flow as shown by hatched portions in FIG. 7a, the output of the AFS2 becomes greater than the actual intake air quantity when the reverse flow occurs. On the other hand, FIG. 7b shows that the intake air quantity Qa at the time when the engine is fully opened is greatly higher than the real value in an area where there is a strong reverse flow and at which time the engine is in a low revolution. The area corresponds to the area where gasoline is reversely flown. Therefore, the value $Q_{MAX}$ is previously determined so that it is slightly greater than the real intake air quantity in a fully opened state of the engine.

Now, returning to FIG. 6, when a relation of $Qa > Q_{MAX}$ is established, namely, the engine is operated under the fully opened condition that causes the reverse flow of the fuel-air mixture at Step S23, the burning-off prohibition flag is set at Step S24. A timer is started at step S25 and the burn-off flag is not reset until this timer has expired. The working time of the timer is determined so as to correspond the time that the gasoline having been reversely flown around the AFS2 in the fully opened condition of the engine is entirely evacuated by a fresh air.

The program from Step S26, where determination of the situation of the timer is made, to Step S25, where the burning-off operation is carried out, is the same as the program of the first embodiment provided that the sensor detects the reverse flow of the fuel-air mixture from the engine operated under the fully opened condition.

Figure 8:
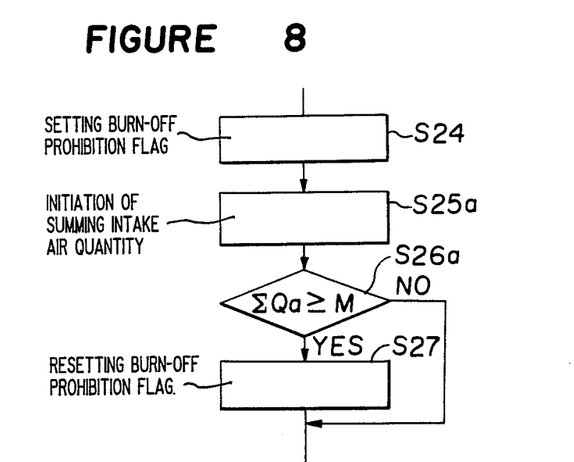
FIG. 8 is a flow chart showing a modification of the flow chart shown in FIG. 6.

FIG. 8 shows a modification of the second embodiment of the present invention. The program of the modified embodiment is the same as that in FIG. 6 except Steps S24–S27.

In FIG. 8, when the burning-off prohibition flag is set at Step S24, summing of the intake air quantity is started at Step S25a. The value obtained by the summing is cleared to be an initial value at each time when the summed value reaches a predetermined value given at Step S25a during the fully opened operation of the engine, and a summing operation is started again. The summed value $\Sigma Qa$ is compared with a predetermined value M at Step S26a. If a relation of $\Sigma Qa \geq M$ appears, the burning-off prohibition flag is reset at Step S27. The predetermined value M is so determined as to correspond to the total intake air quantity necessary to entirely evacuate the gasoline reversely flown under the fully opened condition. Once a relation of $\Sigma Qa \geq M$ is established, the burning-off prohibition flag is reset because it is unnecessary to prohibit the burning-off operation.

In the detection of the fully opened condition of the engine, the same effect can be obtained even by determining the value $Q_{MAX}$ to be smaller than the real intake air quantity in the fully opened condition of the engine.

As another way of the detection of the fully opened condition of the engine, an output of the throttle sensor may be utilized, or a switch which actuates at the fully opened position of the throttle valve 3 may be utilized.

Thus, in accordance with the second embodiment, the burning-off is prohibited for a predetermined time period after a high load operation such as the fully opened condition of the engine has been finished. Accordingly, there can be avoided the disadvantage that the gasoline reversely flown by the high load operation is fired. Further, the high load operation can be detected by utilizing the waveform of the output of the hot-wire type intake air quantity sensor. In addition, the function of prohibiting the burning-off can be obtained by some modification of the program at fairly low cost.

Figure 9:
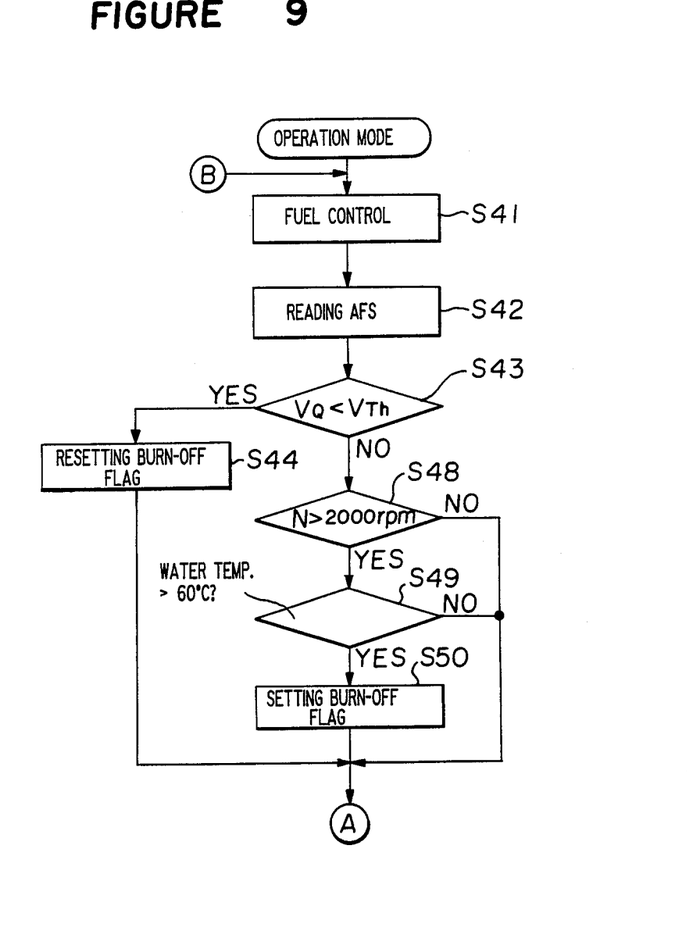
FIGS. 9 and 10 show a flow chart showing an example of execution of a program for the fuel control apparatus of the present invention.
Figure 10:
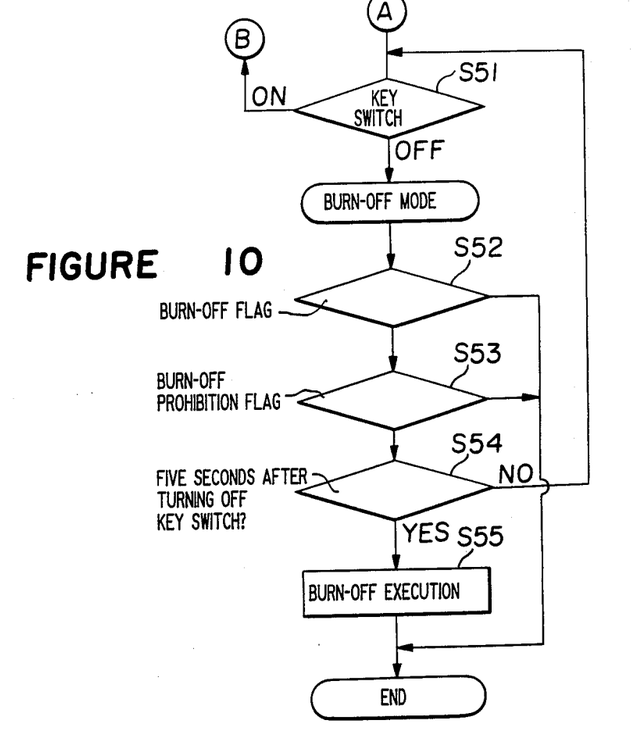
Figure 11:
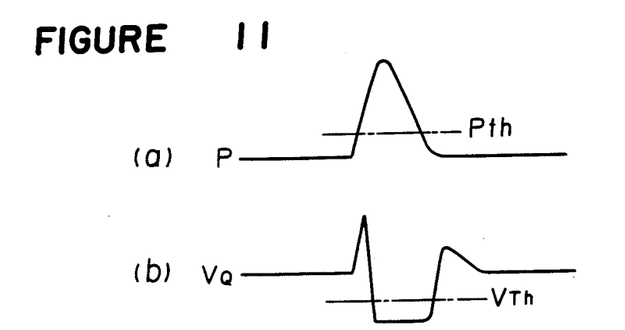

A third embodiment of the present invention will be described with reference to FIGS. 9 to 11. FIGS. 9 and 10 shows a program for carrying out the burning-off operation of the fuel control apparatus and FIG. 11 shows waveforms of pressure in the intake passage and the output of the hot-wire type intake air quantity sensor used for the fuel control apparatus.

The construction of the third embodiment is the same as that of the first embodiment shown in FIGS. 1 and 2, and therefore, description on the general construction is omitted.

In FIG. 9, a series of fuel control operations is carried out as a usual manner at Step S41. Then, an output voltage $V_Q$ (as shown in FIG. 11b) generated from the AFS2 is read at Step S42 and the voltage value is compared with a predetermined value $V_{th}$ at Step S43. The predetermined value $V_{th}$ will be described with reference to FIG. 11. FIG. 11a is a characteristic curve of a pressure P in the intake passage when the back fire takes place and FIG. 11b shows the waveform of the output voltage $V_Q$ of the AFS2 at that time. When the back fire takes place, the pressure in the intake passage increases and at the same time, an intense reverse flow of air is produced in the intake passage. Since the AFS2 can not detect the direction of the air stream, there causes increase in the output voltage $V_Q$ due to the intense reverse flow. Then, a hot gas by the back wire comes to the AFS2 to heat the hot wire of the AFS2 at an abnormal temperature. On detecting the abnormal temperature of the hot wire, an electric current to the AFS2 is stopped by a temperature control circuit, whereby the output voltage $V_Q$ is reduced to be almost zero volt. When energy of the gas of back fire becomes weak and the air stream in the intake passage becomes normal, the operation of the temperature control circuit is returned to the normal condition. In this case, the predetermined value $V_{th}$ is so determined as to be slightly higher than the level to which the output voltage $V_Q$ of the AFS2 is reduced when the back fire occurs.

Returning to FIG. 9, when a relation of $V_Q < V_{th}$ is established at Step S43, namely, the back fire occurs, the burning-off flag is reset at Step S44.

When a relation of $V_Q \geq V_{th}$ is established, namely, the back fire does not occur, the sequential operation moves from Step S43 to Step S48. At Step S48, when the revolution N exceeds 2000 rpm, then, Step S49 is taken where determination is made as to whether or not the temperature of water is 60° C. or higher. If the water temperature is 60° C. or higher, it is determined that the warming-up operation of the engine is finished and it is operated at a high speed. In this case, the gasoline exceedingly supplied and staying in the intake passage during the warming-up operation is sufficiently evacuated. Then, determination that the burning-off operation is possible is made, and the burning-off flag is set at Step S50. In the case that time is required to evacuate the gasoline staying in the intake passage, the timing of setting of the flag may be delayed at Step S50.

Steps S48–S50 follow logic which has been known.

At Step S51, the situation of the key switch is judged. If the key switch is in an on state, the sequential operation is returned to Step S41 to continue the engine operation mode. If the key switch is in an off state, the sequantial operation moves to burning-off mode. At Step S52, the situation of the burning-off flag is judged. If it is in a set state, then, Step S53 is taken where the situation of the burning-off prohibition flag is judged. If the burning-off flag is in a reset state, the sequential operation moves to Step S54 where determination is made as to whether or not 5 seconds has lapsed after the key switch had been turned off. The time of 5 seconds is determined as mentioned in the second embodiment. When the time goes on, the burning-off operation is carried out at Step S55. In the burning-off operation a pulse having about one second is produced for the AFS2.

If the back fire takes place, but the conditions that the revolution of the engine is 2000 rpm or higher and the temperature of cooling water is 60° C. or higher are not satisfied, the burning-off flag is kept in a reset state. Under the circumstances, the burning-off operation is not carried out by the determination at Step S53. Accordingly, the disadvantage that the gasoline reversely flown by the back fire may be fired by the burning-off can be eliminated.

In the third embodiment of the present invention, the back fire can be detected by comparing an output from a pressure sensor placed in the intake passage with the predetermined value $P_{th}$ in consideration that pressure in the intake passage increases when the back fire takes place, in place of the detection of the back fire by utilizing the waveform of the output from the AFS2. The third embodiment of the present invention provides the same function and advantage as those described with respect to the first embodiment.

A fourth embodiment of the fuel control apparatus according to the present invention will be described with reference to FIGS. 12 to 14.

The construction of the fuel control apparatus is the same as that of the first embodiment shown in FIGS. 1 and 2 except the program for controlling the burning-off operation.

A program for effecting the burning-off operation of the fourth embodiment will be explained with reference to FIGS. 12 and 13. In operation mode, a series of fuel control operations is carried out as a usual manner at Step S61. An output from the AFS2 is read at Step S62 and the output value is compared with a predetermined value $Q_{MAX}$ at Step S63. FIG. 14 shows a waveform of the output Qa of the AFS2 and a relation of the intake air quantity Qa and revolution of the engine. Determination of the predetermined value $Q_{MAX}$ is made in the same manner as the description on the second embodiment with reference to FIG. 7. Therefore, description of the determination of the predetermined value $Q_{MAX}$ is omitted.

Figure 12:
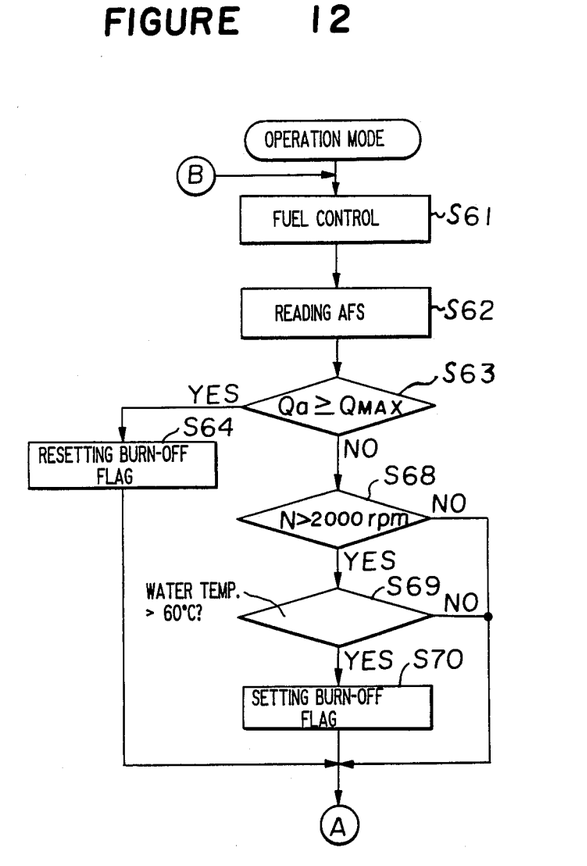
FIGS. 12 and 13 show a flow chart for an example of execution of a program for the fuel control apparatus of the present invention.
Figure 13:
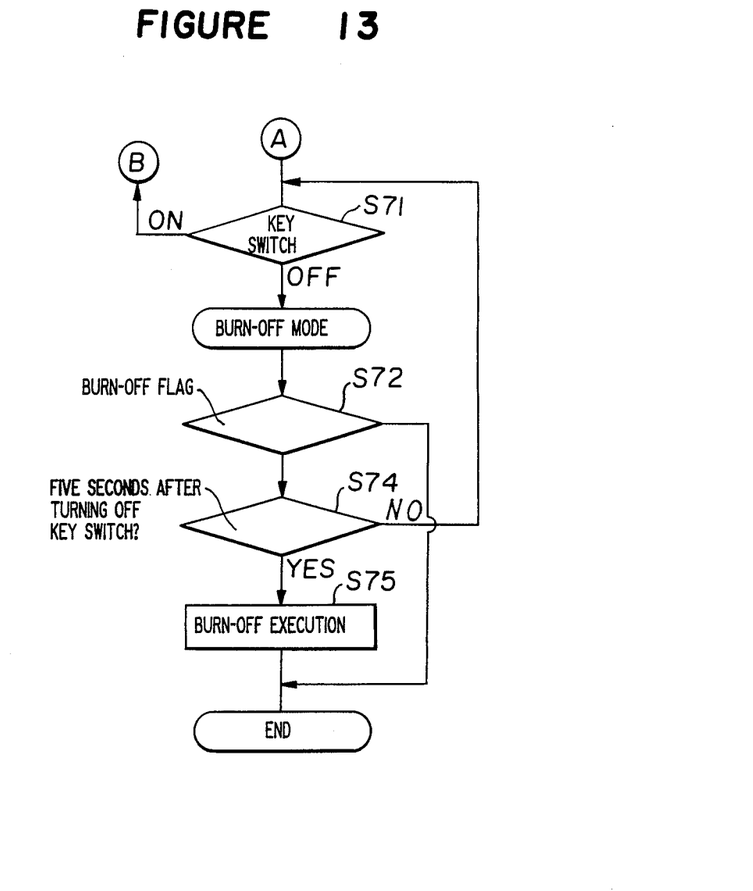
Figure 14A:
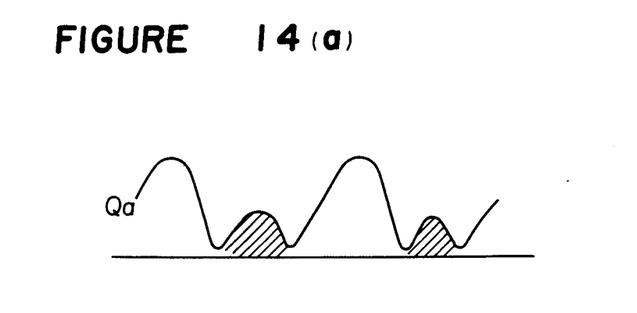
FIGS. 14(a) and 14(b) are waveforms of an output from an intake air quantity sensor for the fuel control apparatus when an internal combustion engine is operated under fully opened condition.
Figure 14B:
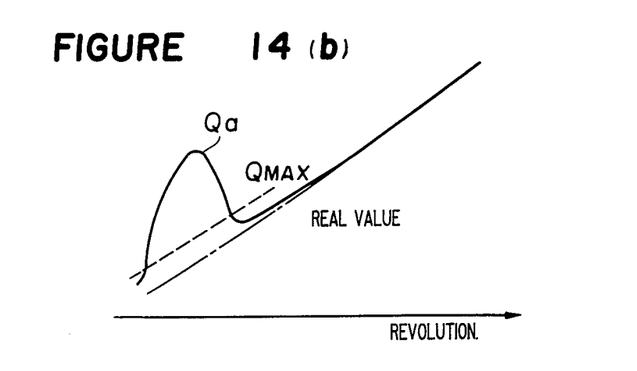

In the flow chart as shown in the FIGS. 12 and 13, when a relation of $Q_a > Q_{MAX}$ is given at Step S63, namely, the engine is operated under the fully opened condition which causes the reverse flow of the fuel-air mixture, the determination that the burning-off operation is impossible is made and the burning-off flag is reset at Step S64. On the other hand, if a relation of $Q_a \leq Q_{MAX}$ appears, then, determination is made as to whether the revolution N exceeds 2000 rpm at Step S68. If yes, further determination is made as to whether or not the temperature of cooling water is 60° C. or higher at Step S69. When the water temperature is 60° C. or higher, the warming-up of the engine is finished and the engine is operated at a high speed, whereby the gasoline exceedingly supply and staying in the intake passage during the warming-up operation of the engine is sufficiently evacuated. Then, the burning-off operation becomes possible and the burning-off flag is set at Step S70. In the case that some time is needed to evacuate the fuel-air mixture, the timing of setting the flag may be delayed.

Steps S68 to S70 are logic which has been well known.

In the next place, the situation of the key switch is examined at Step S71. If the key switch is in an on state, the sequantial operation is returned to Step S61 to continue the engine operation mode. If the key switch is in an off state, the mode is changed from the operation mode to burning-off mode. At Step S72, the situation of the burning-off flag is examined. If the burning-off flag is in a set state, then goes to Step S74 where determination is made as to whether or not 5 seconds has lapsed after the turning-off of the key switch. Here, the time is determined as described in the foregoing embodiments when 5 seconds goes on, the burning-off operation is carried out by giving a pulse of about one second to the AFS2 at Step S75.

The discussion as above-mentioned conserns the case that the burning-off flag is in a set condition. However, the burning-off flag is remained in a reset condition until the revolution of the engine exceeds 2000 rpm and the water temperature becomes 60° C. or higher after the fully opened operation of the engine has been finished. Under the circumstances, when the operation mode is changed to the burning-off mode, programed operation is ended without carrying out the burning-off operation by the determination at Step S72. Accordingly, there is avoidable the disadvantage that the gasoline reversely flown under the fully opened condition of the engine is fired.

In the fourth embodiment, the fully opened condition of the engine is detected by comparing the output value of the AFS2 with a predetermined value $Q_{MAX}$ which is slightly higher than the real intake air quantity. However, the same effect can be obtained by the determination of the predetermined value $Q_{MAX}$ to be fairly smaller than the real intake air quantity in the fully opened condition of the engine.

For detecting the fully opened condition of the engine, an output from the throttle sensor may be utilized, or a switch acutuated at the fully opened position of the throttle valve 3 may be used.

In accordance with the fourth embodiment, the burning-off operation is prohibited for a predetermined time after the fully opened operation of the engine has been finished. Accordingly, the firing of the gasoline reversely flown in the intake passage under the fully opened condition can be eliminated.

Further, detection of the fully opened operation can be made by using the waveform of the output from the AFS. Since theory of controlling the prohibition of the burning-off operation can be attained by slight modification of a program, an additional cost for the further modification of the program is minimized.

I claim:

1. A system for controlling a hot-wire type intake air quantity sensor on a water cooled engine comprising:
   first determining means for determining the running state of said engine;
   second determining means for determining the water temperature of said engine;
   burning means coupled to said hot-wire type intake air quantity sensor for heating said sensor to a temperature sufficient to burn off deposits formed on said sensor;
   detecting means for detecting a predetermined pressure condition in the intake manifold of said engine;
   activating means coupled to said burning means, said first and second determining means and said detecting means for activating said burning, only after a predetermined time after the operation of said engine has stopped, said predetermined pressure condition in said intake manifold is not beyond a predetermined threshold and responsive to the temperature of said engine during the last operational cycle of said engine; and
   resetting means for resetting said activating means upon the restarting of said engine.

2. A system according to claim 1, wherein said sensor is adapted to detect a back fire of said engine during said engines operation.

3. The system according to claim 2, wherein detection of the back fire is done by said sensor on the basis that an output voltage from said sensor is lower than a voltage level in the ordinal operation during a predetemined time.

4. The system according to claim 2, wherein the activating means is turned off when at least one of two conditions that said engine is operated for a predetermined time period after the back fire has been detected and that a value obtained by summing the intake air quantity reaches a predetermined value, is accomplished.

5. The system according to claim 1 wherein said activating means is prohibited from operation when the engine is stopped before a predetermined time has passed, or in a period that a value obtained by summing the intake air quantity reaches a predetermined value after operation at a high load level has finished.

* * * * *